Patented Apr. 28, 1936

2,039,243

UNITED STATES PATENT OFFICE 2,039,243

PRODUCTION OF ARTIFICIAL RESINS

Hans Krzikalla, Mannheim, and Werner Wolff, Ludwigshafen-on-the-Rhine, Germany, assignors to I. G. Farbenindustrie Aktiengesellschaft, Frankfort-on-the-Main, Germany No Drawing. Application February 16, 1931, Serial No. 516,213. In Germany March 14, 1930

14 Claims. (Cl. 260—2)

The present invention relates to the production of artificial resins and preparations containing the same.

We have found that the properties of resins of unsaturated character, especially those containing conjugated double bonds i. e. of natural resins consisting of, or comprising, compounds of unsaturated character or of artificial resins prepared from unsaturated resinifiable substances, containing such double bonds, are substantially improved by heating them to at least 110° C. with $\alpha,\beta$-unsaturated $\alpha,\beta$-polycarboxylic acid compounds containing at least 3 oxygen atoms connected to 2 carbon atoms, i. e. polycarboxylic acids, or their anhydrides, acid esters or other acid derivatives, including the corresponding compounds which under the reaction conditions are converted into the aforesaid acids or their derivatives. Acids and their derivatives suitable for the aforesaid purpose are, for example, maleic acid

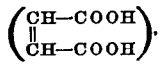

aconitic acid

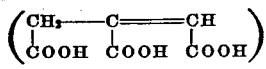

citric acid

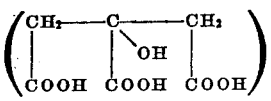

(which is converted into aconitic acid by splitting off water), malic acid

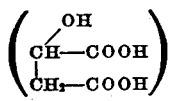

fumaric acid, maleic anhydride

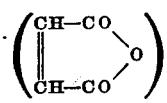

or any other acid compounds which contain the acid radicle

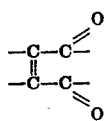

of $\alpha,\beta$-unsaturated $\alpha,\beta$-polycarboxylic acids. Particularly suitable resinous initial materials are colophony or the different acids contained in the different types of colophony, ester gum or other derivatives of colophony, such as salts of colophony or of the acids contained therein, or anhydrides, amides or anilides of colophony or of its acids and materials containing the said compounds. Artificial resins containing colophony and the like, such as resinous condensation products of phenols with formaldehyde and colophony or of phthalic acid with polyhydric alcohols, or with esters or ethers thereof containing at least 2 hydroxyl groups, and colophony may also be employed as well as similar resins in the condensation of which mono-carboxylic acids, or oils containing the same or their esters, such as linoleic acid, ricinoleic acid or acids of other fatty oils have been condensed with the phenols or phthalic acid with formaldehyde or, respectively, polyhydric alcohols. Other natural resins may be employed in so far as they correspond to the aforesaid definition, the unsaturated character being easily ascertained by the coloration of their solutions in acetic anhydride on the addition of concentrated sulphuric acid as for example dammar or yellow gum accroides. The increase in size of the molecule thereby produced gives rise to an advantageous elevation of the melting point, change in the solubility and the like, and the stability to destructive influences, such as the fastness to light, is also increased.

The reaction temperature is generally between 110° and 200° C., heating to from 130° to 180° C. being sufficient in most cases. The quantity of the polycarboxylic compounds may be varied in rather large limits; in most cases the quantities thereof employed will be from 10 to 35 per cent of the unsaturated resin but good results are also obtained with lower quantities say, down to 5 per cent. If turpentine oil or similar impurities should be present, the quantity of the polycarboxylic compounds will be raised; from 20 to 30 per cent being, however, sufficient in most cases. In the reaction the polycarboxylic compounds are apparently linked to the double linkages of the unsaturated resins so that 2 carboxyl groups are introduced if a di-basic carboxylic acid be employed and that a product prepared from an unsaturated, mono-carboxylic resinic acid will contain about 3 carboxylic groups.

The resulting condensation products may be still further changed according to the usual methods. For example, in so far as they contain free carboxyl groups these may be neutralized either with the formation of salts by means of bases, as for example lime, alkyl or alkylol amines or aromatic bases and the like, or by esterification with hydroxyl-bearing, organic substances, such as mono- or polyhydric aliphatic alcohols or phenols or hydroxy carboxylic acids. In so far as esters are present either by starting from resinous esters or by a subsequent esterification with alcohols, a partial reesterification as for example with linseed oil by heating to high temperatures for a long period of time is often advantageous. Depending on the nature of the hydroxyl-bearing substances employed for the esterification and on the reaction conditions, from soft to brittle resinous products may be obtained which possess a different solubility and different acid values; they may be soluble in ethyl alcohol, benzene, linseed oil, turpentine oil or benzine or insoluble therein and may be employed therefore for the most varied purposes as for example for varnishes, oil varnishes, lacquers from cellulose esters and moulding masses.

If desired, the reaction may be carried out in organic solvents, such as chlorbenzenes, solvent naphtha, alkyl benzenes and like inert organic solvents, and the process may be carried out in vacuo, the application of reduced pressure being advantageous for removing volatile remainders of initial material or the solvents if such have been employed. In most cases warming is necessary for initiating the reaction which proceeds with the evolution of heat in most cases; when no evolution of heat occurs warming is generally proceeded with to tempertures of about 80° C. or higher temperatures, the period of working depending on the temperature employed.

The following examples will further illustrate the nature of this invention, but the invention is not restricted to these examples. The parts are by weight.

Example 1

35 parts of maleic anhydride are introduced, while stirring, into 100 parts of fused American root rosin, whereby the temperature rises to about 150° C. The conversion is completed after 1½ hours and this may be easily ascertained because the reaction product no longer reacts in the Storch-Morawski test for colophony. A brown resin, having a softening point about 25° C. above that of the initial rosin, is obtained from which maleic acid cannot be extracted with warm water. It dissolves in aqueous solutions of sodium borate or soda similarly to colophony and is precipitated therefrom by the addition of a strong acid. If about 6 per cent by weight of the resin of slaked lime be added to the resin at 180° C. its acid value is reduced and the mechanical hardness is increased. If 150 parts of root rosin be employed, the reaction product still shows a positive Storch-Morawski reaction and furnishes, after esterification with glycerine, a resin having a softening point above that of colophony glycerine ester. If the condensation be carried out in the presence of linseed oil, linoleic acid, hydrogenated colophony or like hydrogenated resinic acid, cinnamic acid or like carboxylic acid of high molecular weight products are obtained which are easily esterified with hydroxyl-bearing organic compounds with the formation of neutral, easily soluble final products. These additions may also be introduced directly before the esterification with glycerol or like polyhydric alcohol.

Example 2

100 parts of French colophony and 30 parts of maleic anhydride are dissolved in 200 parts of ortho-dichlorbenzene and heated to boiling under a reflux condenser for 4½ hours. After driving off the ortho-dichlorbenzene by means of steam a pale yellowish resin remains behind which is very similar in properties to the resin obtained according to Example 1. The softening point lies at about 100° C. and the iodine value has fallen to 63 from about 180 of the original colophony. The condensation product can be purified by extraction with benzine hydrocarbons or by redissolution in glacial acetic acid or ethyl alcohol, if desired in the presence of a small quantity of a mineral acid, such as hydrochloric acid.

If the products obtained according to Example 1 or 2 are gradually heated to from 250° to 350° C., if desired in the presence of about 5 per cent of zinc chloride, while stirring, and kept at this temperature as long as the evolution of gas can be observed, resins are formed which have a low acid value. If the resulting products or the products directly obtained according to Example 1 or 2 are dissolved in an amount of aqueous caustic soda corresponding to their acid value and a heavy metal salt, as for example lead nitrate, is added to the solution, the corresponding heavy metal salts are formed.

If 33 parts of trihydroxystearic acid and 40 parts of the resin obtained according to Example 1 or the first paragraph of this example be heated for a short period of time in vacuo to 200° C., if desired in the presence of a little glycerol or sorbitol, a resin having properties similar to shellac is formed.

Example 3

100 parts of glycerol or sorbitol ester of American colophony are fused together with 35 parts of maleic anhydride and the melt is kept at 150° C. for 2½ hours. A resin having an acid value of 159 and a saponification value of 287 is obtained which contrasted with the products obtained according to Examples 1 and 2 is not soluble in aqueous alkalies but in benzene. For the production of a varnish an equal quantity by weight of preheated linseed oil can be added to the resin while hot and the temperature kept for about another 5 hours at 250° C. After cooling and adding solvents such as turpentine oil and siccatives, such as lead manganese resinate naphthenate, a lacquer having properties similar to copal lacquer is obtained. If desired, about 25 parts only of maleic anhydride may be employed, whereby a resin with increased softening point is obtained.

Example 4

30 parts of maleic anhydride are gradually introduced into a melt of 100 parts of gum dammar. After heating to from 150° to 160° C. for 3 hours the conversion is completed. Contrasted with the initial material, the new resin is almost entirely dissolved by aqueous soda solutions. The equivalent amount of citric acid may be employed instead of the maleic anhydride.

Example 5

Approximately equimolecular proportions of French colophony and maleic mono-ethyl ester are mixed and heated for about 8 hours under a reflux condenser and then subjected to distillation in vacuo in order to remove remainder of maleic ester. Unchanged maleic ester distils off and a resin similar to colophony remains behind. The reaction product is esterified by heating to about 250° C. at from 20 to 50 millimeters mercury with about one third molecular proportion of glycerol. Instead of the maleic ethyl esters, the iso- or n-butyl esters may be employed.

*Example 6*

100 parts of colophony and 35 parts of maleic anhydride are condensed as described in Example 1 and 30 parts of glycerol are added while hot. After heating for about 10 hours at from 150° to 200° C., preferably at reduced pressure at least towards the end of the heating, a resin soluble in ethyl alcohol and a mixture thereof with benzene is obtained which becomes insoluble in practically all organic solvents by heating for a short time at from about 180° to 250° C. The soluble resin is suitable for the preparation of artificial masses by pressing and heating, if desired after admixing fillers.

*Example 7*

100 parts of colophony and 27 parts of maleic anhydride are condensed as described in Example 1 and from 20 to 30 parts of glycerol or of a mixture thereof with sorbitol or mannitol are added while hot. After heating for about 1½ hours at from 185° to 255° C., preferably at reduced pressure at least towards the end of the heating, a resin is obtained which is soluble in benzene if the reaction has been carried out with from 20 to 25 parts of glycerol and at from 240° to 255° C. and which is soluble in ethyl alcohol if the reaction has been carried out with from 26 to 30 parts of glycerol and at from 185° to 225° C. If medium quantities of glycerol and medium temperatures be used the resins are soluble only in mixtures of ethyl alcohol and benzene and in butanol. If the heating be protracted to 250° C. for a short time an infusible resin, insoluble in organic solvents, is obtained, which can be rendered soluble in oils, fats or benzene by heating to, say, 340° C. or by introduction into fused natural or artificial resins heated to from 300° to 350° C. The soluble resin is suitable for the preparation of artificial masses by pressing and heating, if desired after admixing fillers. By fusing either of the said products with other resins the softening point of the latter is raised.

*Example 8*

10 parts of hydrochloric acid are introduced into 150 parts of commercial crystallized phenol and then 50 parts of paraldehyde are allowed to flow in while continually stirring at a temperature not exceeding 50° C. After all the aldehyde has been introduced the resulting mass which was originally thinly liquid but which gradually becomes more viscous is kept at the said temperature until it can only be stirred with difficulty and a sample when cooled solidifies to a hard, pulverizable resinous product. If the said amount of paraldehyde is not sufficient for the production of this product a further amount is added if necessary with the simultaneous addition of a further quantity of hydrochloric acid (from 5 to 10 parts). When the conversion has taken place in the desired manner the resulting resin is gradually introduced in a comminuted form at 120° C. into a melt of 100 parts of a colophony which becomes tacky at from 50° to 55° C. When the whole amount has been introduced, the temperature of the melt is raised gradually to a final value of from 180° to 190° C. After the foaming has ceased, the whole is allowed to cool.

The melt solidifies to a clear, pale yellow to pale brown resin.

This resin is then fused according to the present invention at 150° C. with 10 per cent its weight of maleic anhydride. The maleic anhydride adds on quantitatively and from the resulting reaction product only traces of acid constituents can be dissolved by water. If desired, about equimolecular quantities of cresol and formaldehyde may be condensed, whereupon the resulting product is heated with a condensation product according to Examples 1, 2 or 3, if desired in the presence of glycerol.

*Example 9*

A so-called cumarone resin having an acid value of 0 obtained by polymerization of the cumarone and indene contained in fractions of mineral coal tar oil is condensed with the aid of acids, for example with the aid of boro fluoro acetic acid, at 170° C. with 2.5 per cent by weight of the resin of maleic anhydride. The acid value is increased to about 14.

*Example 10*

115 parts of colophony are mixed with 60 parts of glycerine, 74 parts of phthalic anhydride are added and, while gradually raising the temperature to a final value of 250° C., the whole is heated until the acid value is 5. A pale hard resin is obtained.

100 parts of this resin are stirred for 2¼ hours at from 150° to 160° C. with 26 parts of maleic anhydride or the equivalent amount of maleic acid. The reaction takes place with a slight increase in temperature. The condensation product obtained has an acid character.

*Example 11*

172 parts of fused abietic acid hydroxy ethyl ester (obtainable by acting with ethylene oxide on abietic acid at about 165° C.) are incorporated with 80 parts of maleic anhydride whereby the temperature gradually rises to 150° C. The syrupy initial material is thus converted into a tough hard resin. By keeping the temperature at about 150° C. for from 3 to 6 hours the hardness of the product is increased.

*Example 12*

65 parts of aconitic acid are added in small portions to 100 parts of colophony heated to 150° C., the single portions being added after foaming has ceased. The reaction mixture is then kept at the said temperature for about 4 hours and finally, if desired at a slightly higher temperature, the reaction vessel may be subjected to reduced pressure for the removal of easily volatile constituents, remainders of resinic oils and the like, so that the melting point of the final product is increased. A resin is obtained resembling in its properties that obtainable according to Example 1.

*Example 13*

60 parts of castor oil, 80 parts of a condensation product obtained according to Example 1 or Example 2 are heated for from 10 to 16 hours at from 170° to 250° C. with 12 parts of glycerine. A soft resin is obtained which is soluble in benzene, turpentine oil, butanol and butyl acetate.

*Example 14*

250 parts of a condensation product obtained according to Examples 1, 2 or 3 are dissolved in 300 parts of benzene, or toluene, and heated in an autoclave for from 6 to 12 hours at from 80° to 150° C. together with from 50 to 100 parts of ethylene oxide. A practically neutral resin is obtained. The hydroxy ethyl ester formed can be brought into reaction with colophony, hydrogenated colophony, the resins according to Examples 1 to 3 or other carboxylic acids.

*Example 15*

100 parts of American colophony are stirred at 150° C. with 28 parts of fumaric acid and then heated to from 200° to 250° C. until the reaction mass does not show a positive Storch-Morawski reaction. Water is removed and the fumaric acid is converted into maleic anhydride during the reaction. The reaction product is similar to that described in Example 1 and can be modified as described in this example.

*Example 16*

100 parts of Swedish tall oil (from the production of paper pulp with the aid of the sulphate process) are heated to 160° C. with 17 parts of maleic anhydride and the product is then esterified by heating it with 20 parts of glycerine to 250° C. A soft resin is obtained which can be converted into a rubber-like mass by heating, especially in vacuo, and may be employed as an addition to varnishes or lacquers.

What we claim is:

1. The process for the production of artificial resins, which comprises heating to at least 110° C. a mixture consisting of a resin of unsaturated character with an α,β-unsaturated α,β-polycarboxylic acid compound containing at least three oxygen atoms connected to two carbon atoms.

2. The process for the production of artificial resins, which comprises heating to at least 110° C. a mixture consisting of a resin of unsaturated character with an α,β-unsaturated α,β-polycarboxylic acid compound containing at least three oxygen atoms connected to two carbon atoms, in the presence of an inert organic solvent.

3. The process for the production of artificial resins, which comprises heating to at least 110° C., a mixture consisting of a resin of unsaturated character with an α,β-unsaturated α,β-polycarboxylic acid.

4. The process for the production of artificial resins which comprises heating to at least 110° C. a mixture consisting of a resin of unsaturated character with an α,β-unsaturated α,β-polycarboxylic anhydride.

5. The process for the production of artificial resins, which comprises heating to at least 110° C. a mixture consisting of a resin of unsaturated character with maleic anhydride.

6. The process for the production of artificial resins, which comprises heating to at least 110° C. a mixture consisting of a resin of unsaturated character with from 5 to 30 per cent its weight of an α,β-unsaturated α,β-polycarboxylic acid compound containing at least three oxygen atoms connected to two carbon atoms.

7. The process for the production of artificial resins, which comprises heating to at least 110° C. a mixture consisting of a resin of unsaturated character with an organic compound capable of being converted into an α,β-unsaturated α,β-polycarboxylic acid compound under the said conditions of working.

8. The process for the production of artificial resins, which comprises heating to at least 110° C. a mixture consisting of a resin of unsaturated character with an α,β-unsaturated α,β-polycarboxylic acid compound, containing at least three oxygen atoms connected to two carbon atoms, and neutralizing free carboxyl groups of the resulting products.

9. The process for the production of artificial resins, which comprises heating to at least 110° C. a mixture consisting of an unsaturated resinic acid with an α,β-unsaturated α,β-polycarboxylic acid compound containing at least three oxygen atoms connected to two carbon atoms.

10. The process for the production of artificial resins, which comprises heating to at least 110° C. a mixture consisting of a resin comprising colophony with an α,β-unsaturated α,β-polycarboxylic acid compound containing at least three oxygen atoms connected to two carbon atoms.

11. The process for the production of artificial resins, which comprises heating to at least 110° a mixture consisting of a resin comprising colophony with an α,β-unsaturated α,β-polycarboxylic acid compound, containing at least three oxygen atoms connected to two carbon atoms, and neutralizing free carboxyl groups of the resulting product.

12. A soluble, artificial resin consisting of colophony, chemically modified by the addition of maleic acid.

13. A soluble chemically modified naturally unsaturated resin produced by the process of claim 1.

14. A soluble chemically modified naturally unsaturated resin produced by the process of claim 8.

HANS KRZIKALLA.
WERNER WOLFF.